(12) United States Patent
Yamamoto et al.

(10) Patent No.: US 8,453,780 B2
(45) Date of Patent: Jun. 4, 2013

(54) ELECTRICAL COMPONENT ATTACHMENT STRUCTURE FOR TWO-WHEELED MOTOR VEHICLE

(75) Inventors: Takao Yamamoto, Wako (JP); Tatsuya Sasaki, Wako (JP); Kunihiro Kai, Wako (JP); Takashi Sasaki, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 107 days.

(21) Appl. No.: 12/353,417

(22) Filed: Jan. 14, 2009

(65) Prior Publication Data

US 2009/0194355 A1 Aug. 6, 2009

(30) Foreign Application Priority Data

Jan. 31, 2008 (JP) .................. 2008-021467

(51) Int. Cl.
*B62K 11/04* (2006.01)
*B62K 19/30* (2006.01)

(52) U.S. Cl.
USPC .......................... 180/219; 180/312

(58) Field of Classification Search
USPC .................................. 180/219, 312
See application file for complete search history.

(56) References Cited

U.S. PATENT DOCUMENTS 6,318,743 B1 * 11/2001 Nakashima et al. ....... 280/152.1

FOREIGN PATENT DOCUMENTS

| JP | 63-32088 U | 3/1988 |
| JP | 63-82886 A | 4/1988 |
| JP | 07-69259 A | 3/1995 |
| JP | 9-52586 A | 2/1997 |
| JP | 2004-276864 A | 10/2004 |

* cited by examiner

*Primary Examiner* — Tony H. Winner
*Assistant Examiner* — Jacob Knutson
(74) *Attorney, Agent, or Firm* — Westerman, Hattori, Daniels & Adrian, LLP

(57) ABSTRACT

An electrical component attachment structure for a two-wheeled motor vehicle includes a main frame supporting components of a vehicle body such as an engine, a center frame extending vertically behind the engine, and a pair of right and left seat rails detachably attached to the center frame, the seat rails being attached with a bracket which supports an electrical component, in which the bracket is formed in an approximate U-shape and is arranged with an opening section of the U-shape directed towards the front of the vehicle body, so that the bracket is configured to support the electrical component inside the approximate U-shape and to allow the electrical component to be taken out towards the front of the vehicle body from the opening section.

12 Claims, 12 Drawing Sheets

ELECTRICAL COMPONENT ATTACHMENT STRUCTURE FOR TWO-WHEELED MOTOR VEHICLE

TECHNICAL FIELD

The present invention relates to an electrical component attachment structure for two-wheeled motor vehicle for attaching an electrical component to a seat rail.

BACKGROUND OF THE INVENTION

Conventionally, in off-road two-wheeled motor vehicles, seat rails are removed to perform maintenances of, for example, engines, rear cushions, or the like in some cases. As such seat rail, one attached with an electrical component for controlling a throttle body and the like is known (for example, Japanese Patent Application Publication No. 2004-276864).

In the two-wheeled motor vehicle in which the electrical component is attached to the seat rail, the electrical component as well as wiring and a connector connected to the electrical component are removed together when the seat rail is removed for maintenance. Therefore, the maintenance work is complicated.

SUMMARY OF THE INVENTION

The present invention has been made in view of the circumstance described above, and provides an electrical component attachment structure for a two-wheeled motor vehicle in which a seat rail can be removed to easily perform maintenance.

The present invention is characterized as an electrical component attachment structure for a two-wheeled motor vehicle including a main frame supporting components of a vehicle body such as an engine; a center frame extending vertically behind the engine; and a pair of right and left seat rails detachably attached to the center frame, the seat rails being attached with a bracket which supports an electrical component. In this electrical component attachment structure, the bracket is formed in an approximately U-shape and is arranged with an open section of a U-shape directed towards the front of the vehicle body. Thus, the bracket is configured to support the electrical component inside the approximately U-shape, and to allow the electrical component to be taken out toward the front of the vehicle body from the open section.

With this configuration, the seat rail can be removed with the electrical component left on the vehicle body side.

The electrical component is preferably supported by the bracket with an elastic member therebetween.

With this configuration, the electrical component can be protected from vibration, and the electrical component can be reliably supported inside the bracket.

Further, the bracket also forms a cross member connecting the right and left seat rails, and a seat engagement section, to which a seat is attached, may be formed on an upper surface of the bracket.

With this configuration, other than the function of attaching the electrical component, the bracket may additionally have a function of a strengthening member which improves the rigidity of the right and left seat rails, and may additionally have a function of fixing the seat.

The bracket may be formed with an exposed opening section from which the supported electrical component is exposed to the outside.

With this configuration, the electrical component can be directly gripped from the exposed opening section, whereby the work of taking out the electrical component from the bracket becomes easy.

The bracket may be formed with a restriction section which engages with the elastic member to restrict a position of the elastic member.

With this configuration, the position of the elastic member is restricted, and a displacement of the elastic member in the bracket can be prevented.

Further, the bracket may be formed with an interference prevention section which prevents the seat and the elastic member from interfering with each other.

With this configuration, a displacement of the elastic member or the electrical component in the bracket due to interference between the seat and the elastic member at the time of attachment and detachment work of the seat can be prevented.

In the electrical component attachment structure for a two-wheeled motor vehicle according to the present invention, the bracket is formed in the approximately U-shape, the opening section of the U-shape is arranged to be directed toward the front of the vehicle body, the electrical component is supported inside the approximately U-shape, and the electrical component can be taken out towards the front of the vehicle body from the opening section. Accordingly, the electrical component can be taken out towards the front of the vehicle body from the U-shaped opening section of the bracket when removing the seat rails from the center frame. Therefore, the seat rails can be removed in a state where the electrical component is left on the vehicle body side without removing the electrical component and the wiring thereof. Therefore, the attachment and detachment of the seat rails at the time of maintenance and the like can be performed easily.

Since the electrical component is supported inside the bracket with the elastic member therebetween, the electrical component can be protected from vibration by the elasticity of the elastic member. Accordingly, the vertical vibration and the like of the vehicle body while running can be absorbed by the elastic member, and the reliability of the electrical component can be improved. Since the electrical component can be removed from the seat rails without removing a tightening member such as a bolt, the attachment and detachment of the seat rails can be performed easily.

Further, since the bracket forms a cross member connecting the right and left seat rails, and the upper surface of the bracket is formed with the seat engagement section to which the seat is attached, the function of a strengthening member can be added to the bracket. Also, the function of fixing the seat can be added to the bracket functioning as the strengthening member. Accordingly, the space in the vicinity of an attachment section of the electrical component can be utilized effectively.

Since the bracket is formed with the exposed opening section in which the supported electrical component is exposed to the outside, the electrical component can be directly held by hand from the exposed opening section to be pulled out. Thus, the removing the electrical component becomes easy. As a result, removing the seat rails can be performed easily.

Since the bracket is formed with the restriction section which engages with the elastic member to restrict the position thereof, the elastic member can be prevented from being displaced in the bracket due to the vibration of the vehicle body or the like. As a result, the electrical component can be attached more reliably.

Moreover, since the bracket is formed with the interference prevention section which prevents the seat and the elastic member from interfering each other, the displacement of the elastic member or the electrical component in the bracket due to the interference between the seat and the elastic member at the time of the attachment and detachment of the seat can be prevented. As a result, unnecessary vibration or the like is not applied to the electrical component by the attachment and detachment of the seat, and the reliability of the electrical component can be improved.

BRIEF DESCRIPTION OF THE DRAWINGS

The advantages of the invention will become apparent in the following description taken in conjunction with the drawings, wherein.

DETAILED DESCRIPTION OF THE INVENTION

Figure 1:
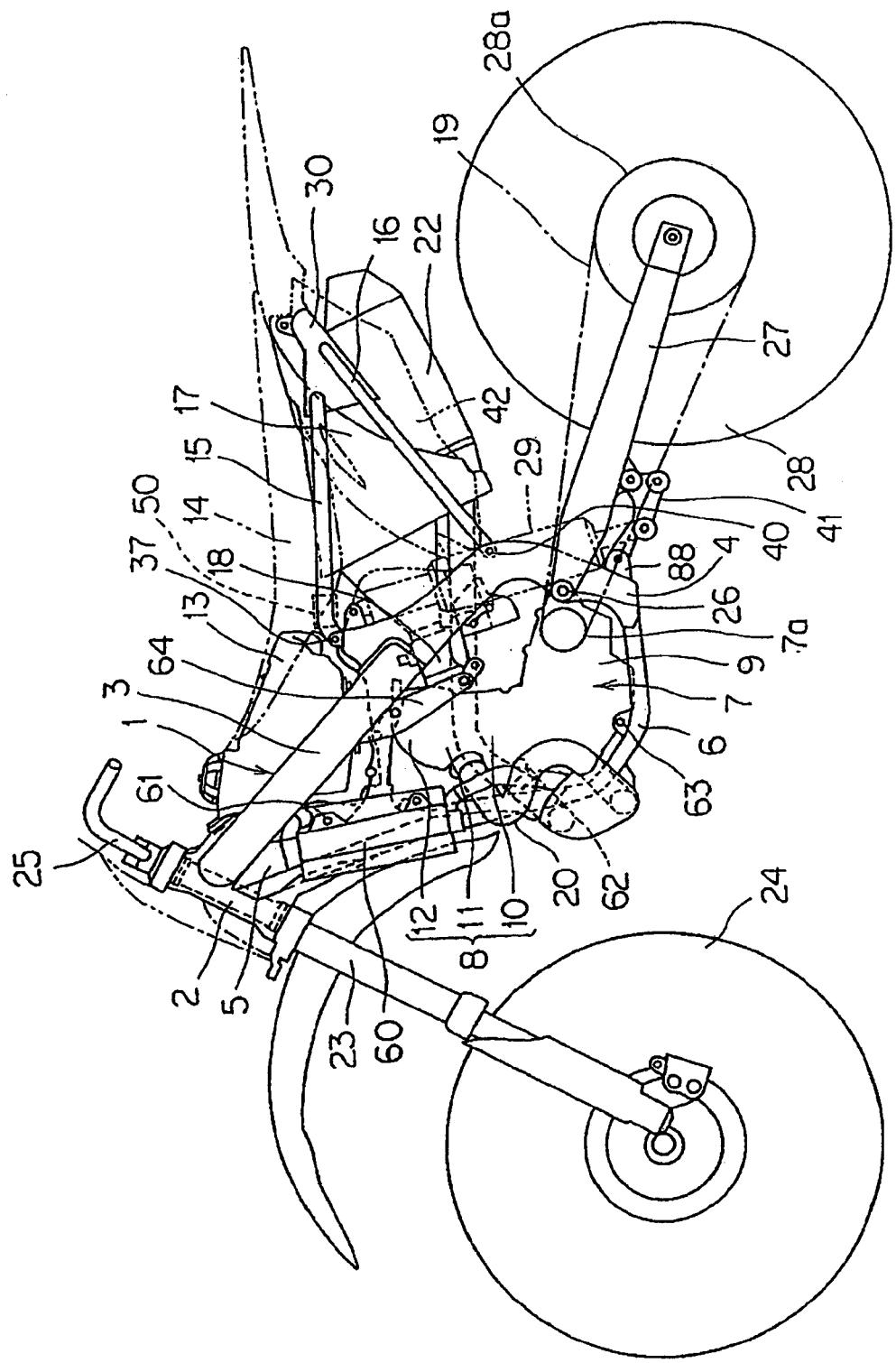
FIG. 1 is a side view of a two-wheeled motor vehicle in an embodiment of the present invention.

Hereinafter, one embodiment will be described based on the drawings. FIG. 1 is a side view of an off-road two-wheeled motor vehicle including an electrical component attachment structure for a two-wheeled motor vehicle according to the embodiment of the present invention.

A vehicle body frame 1 of the two-wheeled motor vehicle includes a head pipe 2, a main frame 3, a center frame 4, a down frame 5, and a lower frame 6, which are connected in loop form to support an engine 7 in the inside thereof. The engine 7 includes a cylinder 8 and a crank case 9. The main frame 3, the center frame 4, and the lower frame 6 are provided respectively in right and left as pairs, and the head pipe 2 and the down frame 5 are provided singularly along the center of the vehicle body.

The main frame 3 extends above the engine 7 obliquely downward and rearward in straight line, and is connected to an upper end section of the center frame 4 extending in the vertical direction behind the engine 7. The down frame 5 extends obliquely downward and rearward in front of the engine 7, and a lower end section of the down frame 5 is connected to a front end section of the lower frame 6. At a front side lower section of the engine 7, the lower frame 6 bends to extend rearward below the engine 7 approximately linearly. A rear end section of the lower frame 6 is connected to a lower end section of the center frame 4.

The engine 7 employs, for example, a water-cooled four-stroke system. The cylinder 8 is provided to a front section of the crank case 9 in an upright state in which the cylinder axis thereof is approximately vertical, and includes a cylinder block 10, a cylinder head 11, and a head cover 12 in this order from bottom to top. When the cylinder 8 is upright, the engine 7 is shortened in the front-back direction to make the configuration of the engine 7 suitable for an off-road vehicle.

Above the engine 7, a fuel tank 13 is arranged and supported on the main frame 3. Inside the fuel tank 13, a built-in fuel pump 70 (see FIG. 6) is stored, and high-pressure fuel is supplied from the fuel pump to a throttle body 18 via a fuel supply pipe.

A seat 14 is arranged behind the fuel tank 13 to be supported on the seat rail 15 extending rearward from the upper end of the center frame 4. Below the seat rail 15, a rear frame 16 is arranged. The seat rail 15 and the rear frame 16 support an air cleaner 17, whereby air is taken in from the rearward side of the vehicle body to the cylinder head 11 via the throttle body 18.

In the front section of the cylinder 8, an exhaust pipe 20 is provided. The exhaust pipe 20 extends from the front section of the cylinder 8 to the front of the crank case 9, bends toward the right, and is then drawn around to be directed rearward on the right side of the vehicle body. A muffler 22 extends rearward from the exhaust pipe 20. A rear end section of the muffler 22 is supported by the rear frame 16.

The head pipe 2 supports a front fork 23, and a front wheel 24 supported by a lower end section thereof is steered by a handle 25. The center frame 4 swingably supports a front end section of a rear arm 27 by a pivot shaft 26. A rear end section of the rear arm 27 supports a rear wheel 28, which is driven by a drive chain 19 wound around a drive sprocket 7a of the engine 7 and a driven sprocket 28a of the rear wheel 28. Between the rear arm 27 and a rear end section of the center frame 4, a cushion unit 29 of a rear suspension is provided.

Note that, in FIG. 1, reference numeral 60 denotes a radiator, 61 denotes a rubber mount section, 62 and 63 denote engine mount sections, and 64 denotes an engine hanger. Note that the engine 7 is supported by the center frame 4 and also by the pivot shaft 26.

Figure 2:
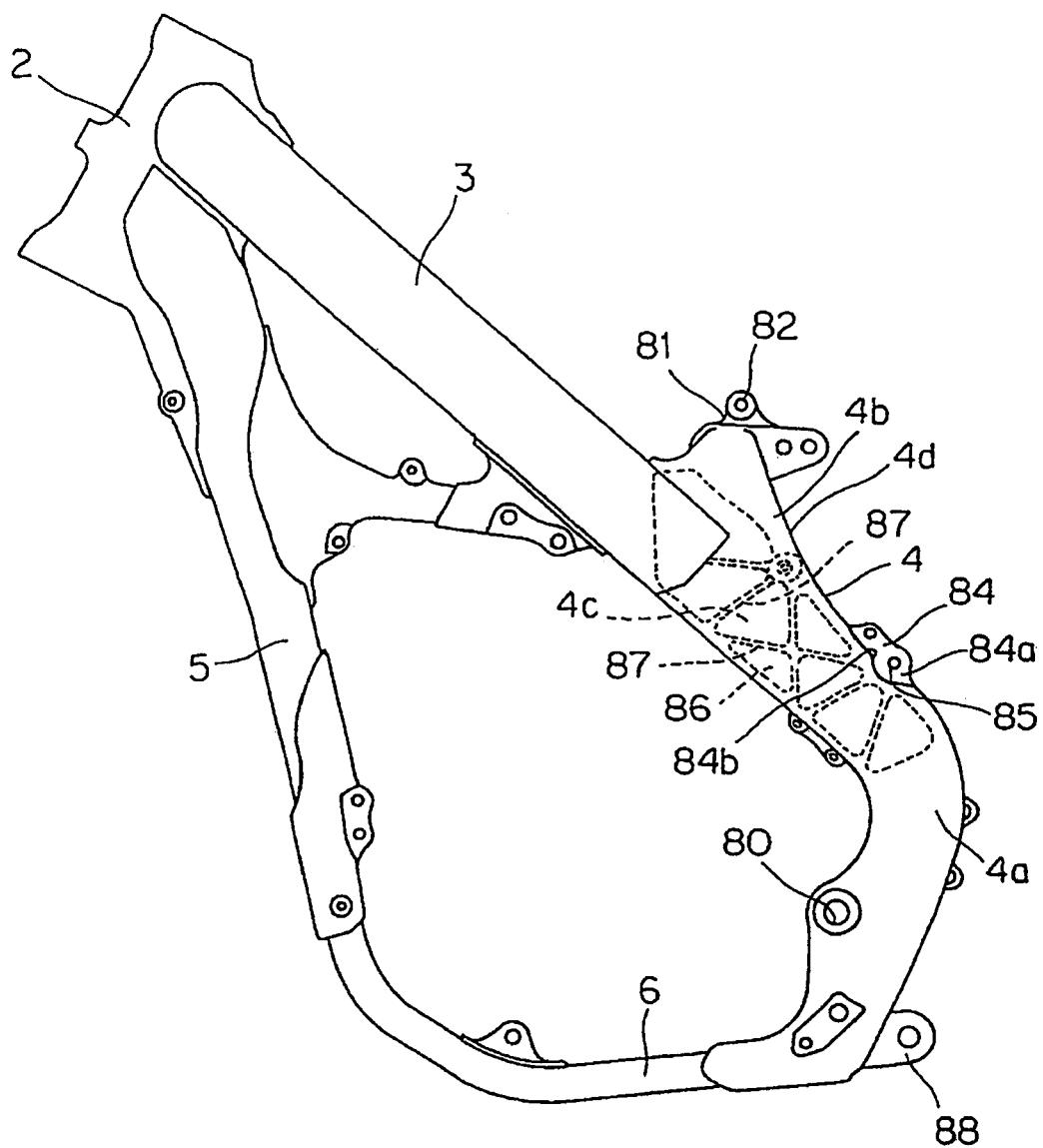
FIG. 2 is a side view of a vehicle body frame.

FIG. 2 is a side view of the vehicle body frame 1. Note that the center frame 4 is horizontally symmetrical, and has common shapes on the right and left portion unless stated in particular.

In the body frame 1, as described above, the main frame 3, the center frame 4, the down frame 5, and the lower frame 6 are connected in loop form in an approximate triangle shape, and the engine 7 is supported inside this triangle.

Of these, as shown in FIG. 2, the right and left pair of the center frames 4 on the rearward side of the vehicle body extend vertically, and include bend sections 4a bent in V-shapes having vertical center sections thereof directed rearward of the vehicle body.

On a slightly lower side of the bend section 4a, a pivot hole 80 to which the pivot shaft 26 is attached is formed.

On a slightly upper portion of the bend section 4a and the upper surface side of the center frame 4, a concave section 84 to which one end section of the rear frame 16 is attached is provided. The concave section 84 is configured of an attachment surface 84a in which an outside surface 4b of the center frame 4 is depressed inward of the vehicle body, and a cutout wall section 84b in which an upper surface 4d of the center frame 4 is cut out in an arc shape directed obliquely frontward and downward. The attachment surface 84a is provided with an attachment hole 85 penetrating in the vehicle body width direction.

On the lower end section of the center frame 4, a tension bracket 88 is provided. The cushion unit 29 is attached to the tension bracket 88 through a link mechanism 41 (see FIG. 1).

On the upper end section of the center frame 4, in a connection section with a rear end section of the main frame 3, a seat rail supporting section 81 is formed. The seat rail supporting section 81 is provided to each of the right and left center frames 4 to protrude upward from the upper surface 4d. An attachment hole 82 is formed in each seat rail supporting section 81.

An inside surface 4c of the center frame 4 is depressed toward the outside of the vehicle body to form plural concave sections 86 for reducing weight of the center frame 4. Between the adjacent concave sections 86, plural ribs 87 for enhancing rigidity of the center frame 4 are provided in a truss form.

Figure 3:
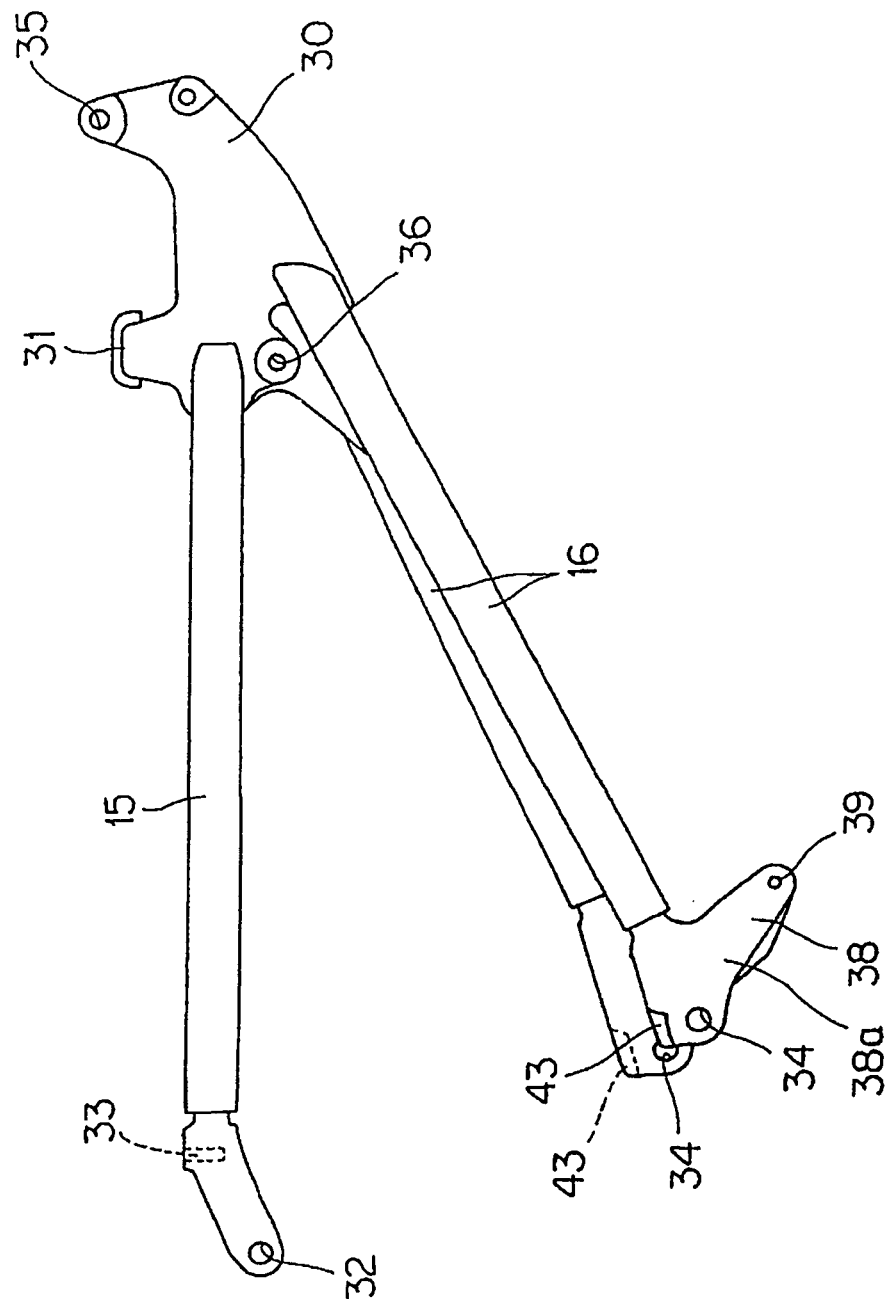
FIG. 3 is a side view of a seat rail and a reinforcement frame being attached integrally.
Figure 4:
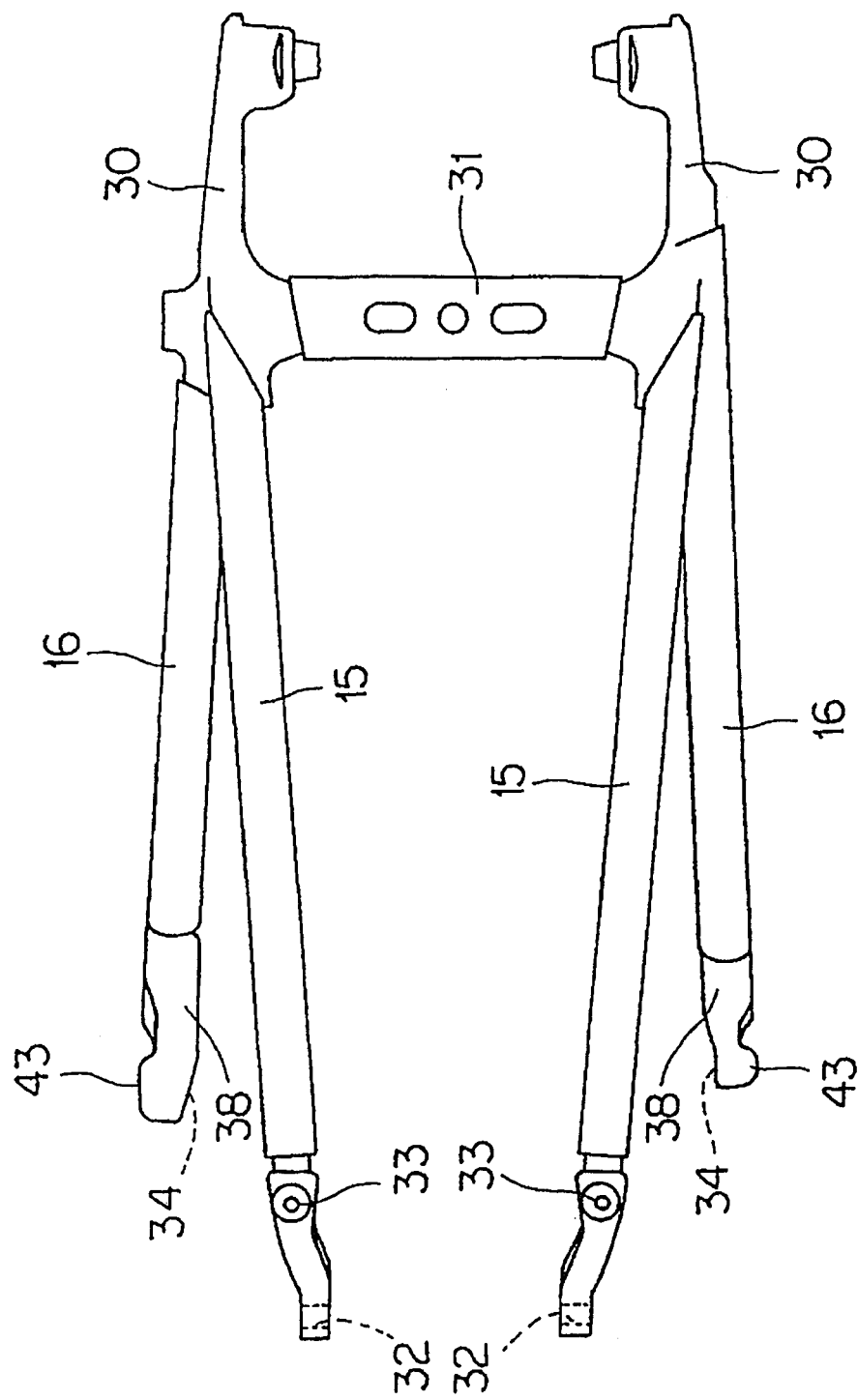
FIG. 4 is a plan view of FIG. 3.

FIG. 3 is side view of the seat rail 15 and the rear frame 16 shown in FIG. 1, and FIG. 4 is a plan view thereof.

The seat rail 15 and the rear frame 16 are each configured in right and left pairs, and the rear sides of the seat rail 15 and the rear frame 16 are integrally attached to a gusset 30.

As shown in FIG. 3, the right and left seat rails 15 extend approximately leveled in the front-back direction, and each of front end sections (left end sections in FIG. 3) thereof are provided with two attachment holes 32 and 33. The attachment holes 32 located in the left end sections are for attaching the seat rails 15 to the attachment holes 82 of the center frame 4 by bolts 37 (see FIG. 1), and are formed respectively to penetrate in the vehicle width direction. The attachment holes 33 are for attaching an ECU bracket 51 (not shown) described later to the seat rails 15 by bolts 53, and are respectively drilled in the vertical direction.

As shown in FIG. 3, the right and left rear frames 16 extend obliquely downward and frontward from the gussets 30 on the rear side of the frames 16, and stays 38 are attached to the front end sections of the frames 16 by welding. The stays 38 each have an attachment surface 38a approximately parallel to a side surface of the vehicle body, and a left side tip end section of the attachment surface 38a is provided with an attachment hole 34 for fixation to the attachment hole 85 of the concave section 84 of the center frame 4 by a bolt 40 (see FIG. 1). On the upper side of the attachment hole 34, a wall section 43 is provided to protrude (bulge) toward the outside of the vehicle body from the attachment surface 38a.

In a lower right section of the attachment hole 34, an attachment hole 39 for attaching a side cover 42 is provided.

Note that the right and left rear frames 16 have slightly different inclination angles, as shown in FIG. 3. Also, the right and left stays 38 have different shapes in relation to the exhaust pipe 20, and the stay 38 on the vehicle right side is made slightly larger in order to provide a fixing section for the muffler 22. Therefore, although the positions of the attachment holes 39 described above are the same on the right and left stays 38, the positions of the attachment holes 34 and the wall sections 43 differ slightly on the right and left stays 38.

As shown in FIG. 3, the right and left gussets 30 are formed with seat attachment holes 35, muffler attachment holes 36, and the like penetrating in the vehicle width direction. As shown in FIG. 4, the right and left gussets 30 are connected firmly to a cross plate 31 extending in the vehicle body width direction by welding to provide rigidity that enables the seat 14 and the muffler 22 to be supported.

The seat rail 15 is attached to the attachment hole 82 of the center frame 4 by the bolt 37 (see FIG. 1) inserted and tightened in the attachment hole 32, and the rear frame 16 is attached similarly by the bolt 40 (see FIG. 1) tightened in the attachment hole 34. That is, the seat rail 15 and the rear frame 16 can be removed from the center frame 4 by removing the bolts 37 and 40. The side cover 42 can also be removed together while being attached to the seat rail 15 and the rear frame 16.

Figure 5:
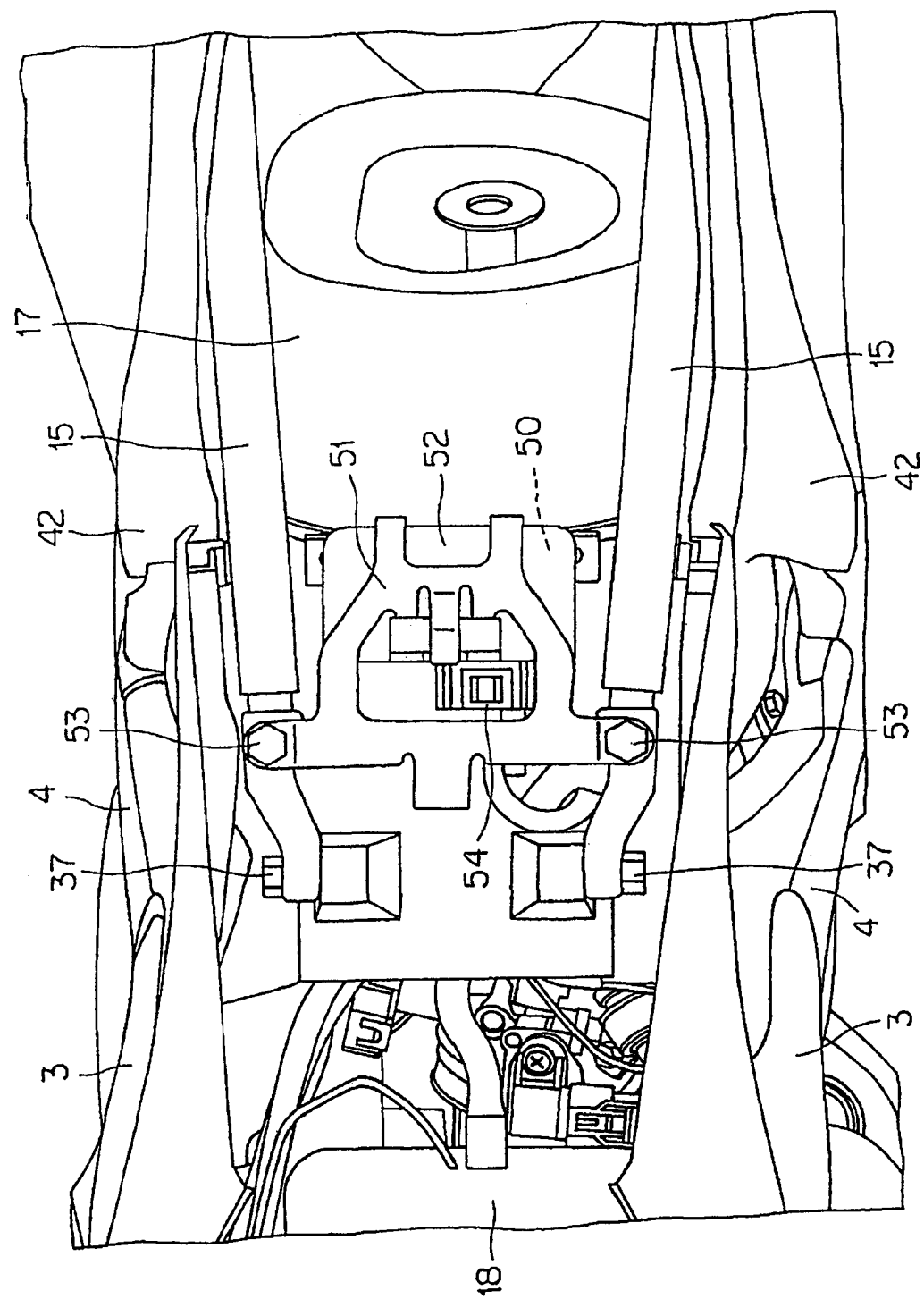
FIG. 5 is a plan view showing a state where a seat and the like are removed from the two-wheeled motor vehicle of FIG. 1.

FIG. 5 is a view of a state where the seat 14 is removed from the two-wheeled motor vehicle of FIG. 1 when seen from the above.

In the state where the seat 14 is removed, the pair of right and left seat rails 15 is seen on the top from a seat opening section thereof. On a front side portion of the seat rails 15, the ECU bracket 51 is attached by the bolts 53 to form a cross member connecting the right and left seat rails 15. The ECU bracket 51 is mounted with an ECU 50 (electronic control unit or electrical component) for FI control with an elastic sheet 52 (elastic member) therebetween. The ECU 50 has an approximately cuboid shape, in which a connector 54 protruding in a forward direction of the vehicle body is provided in a front section thereof and the elastic sheet 52 covers portions other than the front section.

Figure 6:
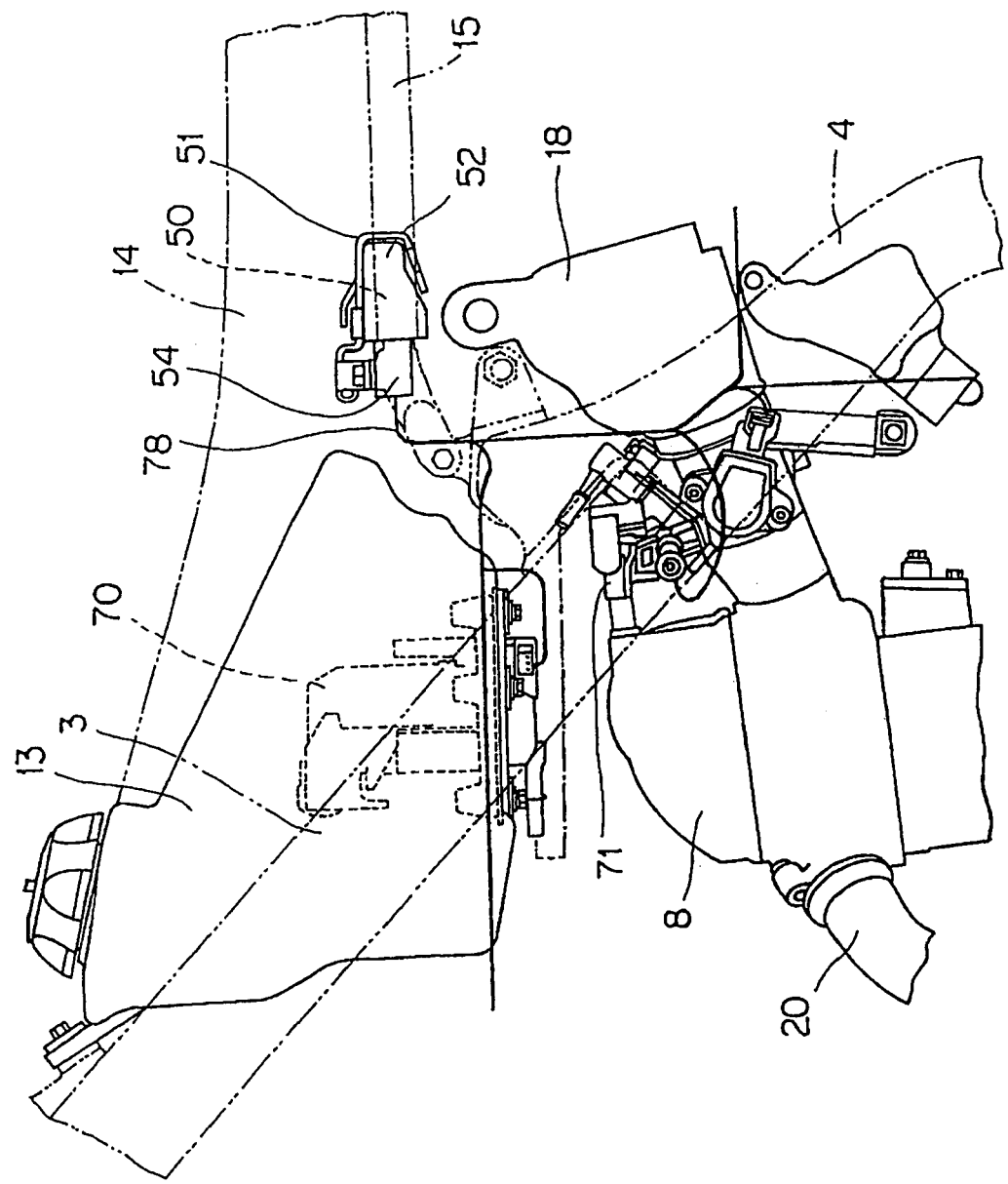
FIG. 6 is a schematic view showing the wiring of an ECU.

FIG. 6 is a schematic view showing the wiring of the ECU 50.

A main wiring 78 connected to the ECU 50 is drawn out from the connector 54 frontward of the vehicle body, then further drawn to the lower side of an attachment section of an upper end section of the cushion unit 29, and then diverges to connect to each instrument. The wiring diverged from the connector 54 is drawn along the main frame 3 or the center frame 4, and is then connected to a fuel pump unit 70 in the fuel tank 13, an electronic fuel injection device 71 of the throttle body 18, and sensors such as a speed sensor (not shown). That is, the ECU 50 is preferably set in a position and distance by which connection with these instruments is easy and in a position in which wiring can easily be performed along the center frame 4 and the like. Thus, the front side portion of the seat rail 15 is suitable for arranging the ECU 50.

Note that the maintenance of the two-wheeled motor vehicle can be performed with the connector 54 described above being detached, but there is a possibility of dirt entering in the connector at the time of the detachment to cause contact failure. Particularly in the case of an off-road two-wheeled motor vehicle, there is a possibility of dirt adhered to the vehicle body entering in, thus attachment and detachment is preferably avoided as much as possible.

Figure 7A:
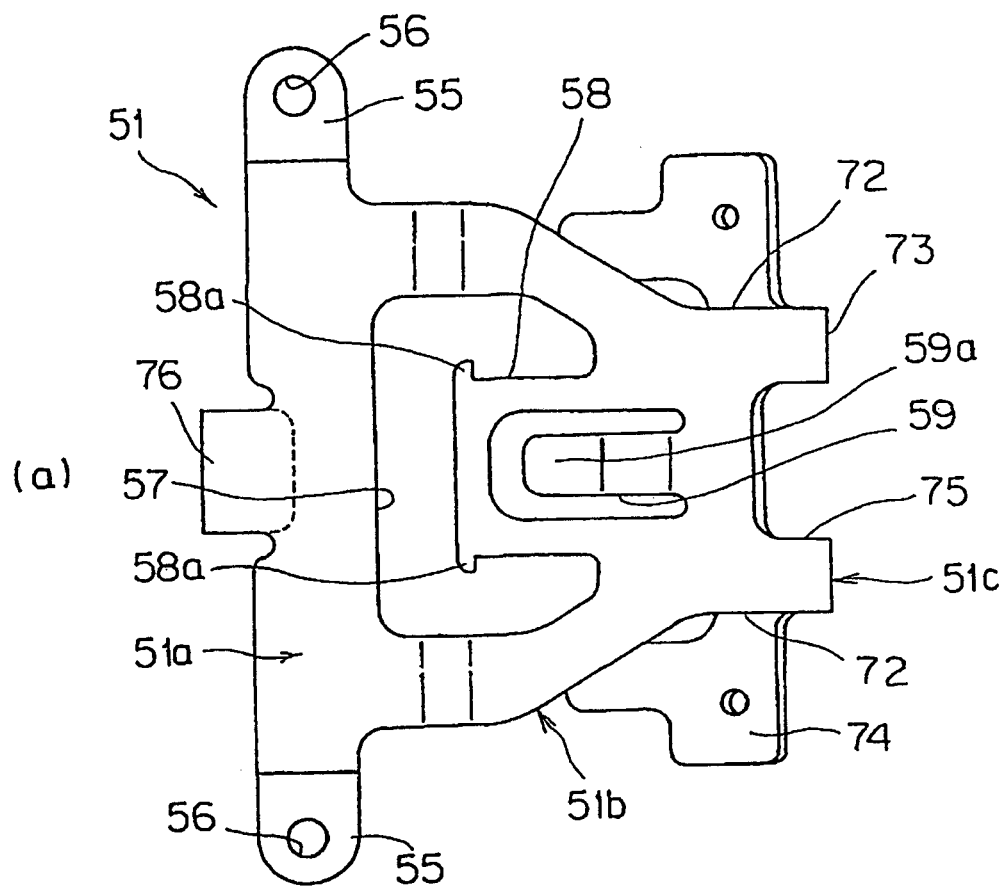
FIG. 7(a) is a plan view of an ECU bracket.
Figure 7B:
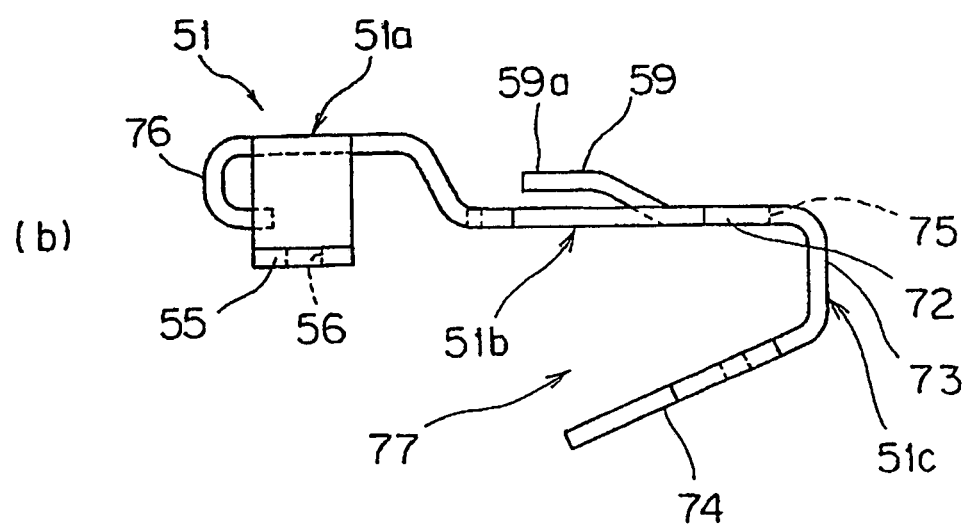
FIG. 7(b) is a side view of the ECU bracket.
Figure 8A:
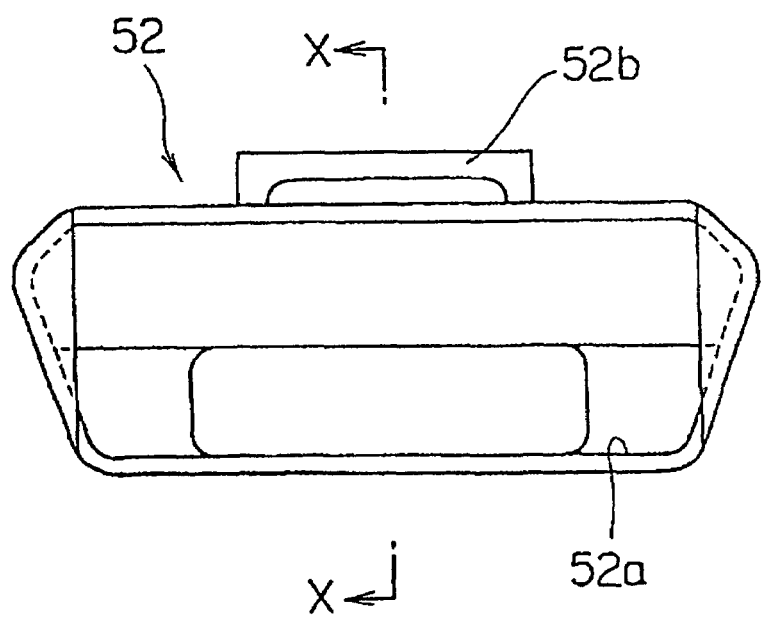
FIG. 8(a) is a front view of an elastic member.
Figure 8B:
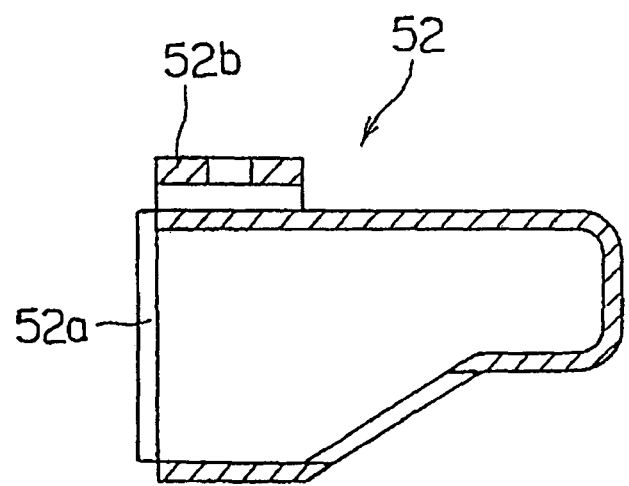
FIG. 8(b) is a sectional view along X-X of FIG. 8(a)
Figure 9:
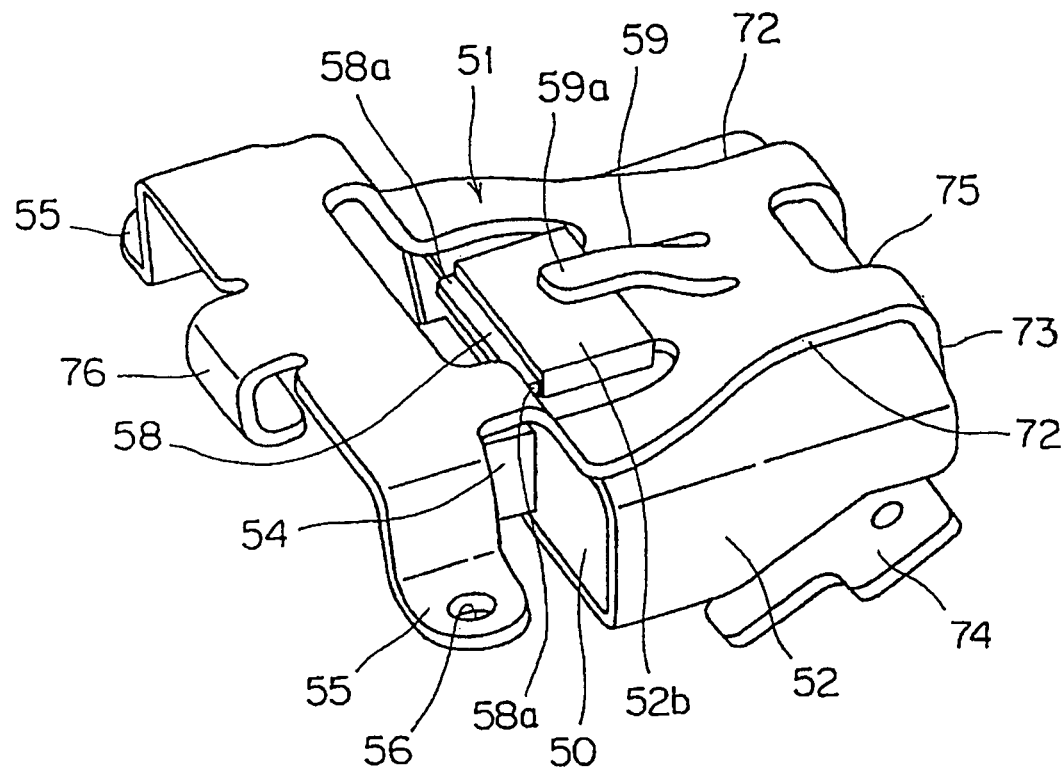
FIG. 9 is a perspective view showing a state where the ECU is supported by the ECU bracket.

FIG. 7(a) is a plan view of the ECU bracket 51, and FIG. 7(b) is a side view thereof. Note that, in FIG. 7, the left side is the front of the vehicle body. FIG. 8(a) is a front view of the elastic sheet covering the outside of the ECU 50, FIG. 8(b) is a sectional view taken along X-X of FIG. 8(a), and FIG. 9 is a perspective view of a state where the ECU 50 is attached to the ECU bracket 51.

The ECU bracket 51 is formed integrally by processing a sheet metal. The ECU bracket 51 is formed in an approximate U-shape having an opening section 77 on the frontward side of the vehicle body when seen from the side as shown in FIG. 7(b). The ECU 50 covered by the elastic sheet 52 is inserted from the opening section 77 into the approximate U-shaped portion to be attached while being sandwiched by an upper side section and a lower side section of the U-shape.

In a front section 51a of the ECU bracket 51, right and left attachment sections 55 extending to the right and left sides and a hook section 76 bent in a U-shape directed downward are formed.

Each of the attachment sections 55 is formed with an attachment hole 56. The bolts 53 (see FIG. 5) are inserted to the attachment holes 56 from the upper side, and are screwed to the attachment holes 33 (see FIGS. 3 and 4) of the right and left seat rails 15. That is, other than a function of attaching the ECU 50, the ECU bracket 51 additionally functions as a strengthening member and connects the right and left sides of the vehicle body as a cross member.

A rubber band (not shown) extending from the fuel tank 13 is hooked to the hook section 76. Accordingly, the fuel tank 13 can be attached more reliably.

As shown in FIG. 7(b), a center section 51b of the ECU bracket 51 is lower with respect to the front section 51a and is formed with a seat locking hole 57 (seat engagement section) for hooking and fixing the seat 14. Behind the seat locking hole 57, the ECU bracket 51 is provided with a restriction section 58 which restricts the positions of the attached elastic sheet 52 and the ECU bracket 51, and an interference prevention section 59 which prevents the attached seat 14 and the elastic sheet 52 from interfering with each other. In a tip end of the restriction section 58, a locking section 58a protruding in the vehicle body width direction is formed.

As shown in FIG. 8(a), the elastic sheet 52 is formed in a bag shape having the opening section 52a on the front side of the vehicle body (near side in FIG. 8(a)), and the approximately cuboid shaped ECU 50 is inserted from the opening section 52a. The elastic sheet 52 also serves the function of reducing the transmission of vertical vibration of the vehicle body to the ECU 50 by its elasticity.

In an upper section of the elastic sheet 52, an approximately rectangle shaped engagement section 52b is formed. As shown in FIG. 9, the restriction section 58 of the ECU bracket 51 is inserted to the engagement section 52b in a state where the ECU 50 is attached to the ECU bracket 51, whereby the locking section 58a is hooked to an edge section of the opening section 52a of the elastic sheet 52. Accordingly, the displacement of the elastic sheet 52 in the front-back direction of the vehicle body is prevented.

The interference prevention section 59 is bent upward from an upper surface of the center section 51b of the ECU bracket 51, and has a contact surface 59a in a position higher than the upper surface of the center section 51b. The contact surface 59a makes contact with a bottom surface of the seat 14 when the seat 14 is attached, whereby the seat 14 contacts the lower side of the interference prevention section 59, thus preventing the seat 14 and the elastic sheet 52 from interfering each other.

As shown in FIG. 7(a), the width dimension between both sides of the center section 51b of the ECU bracket 51 decreases toward the rear side such that both end sections form a constricted shape. By the constricted shape, first exposed opening sections 72 are respectively formed in the both side sections.

From the first exposed opening sections 72, as shown in FIG. 9, both side sections of the ECU 50 protrude (are exposed) respectively in a state where the ECU 50 in attached to the ECU bracket 51. Accordingly, the both side sections of the ECU 50 can be gripped by hand to be pulled out frontward of the vehicle body from the first exposed opening sections 72. Thus, the ECU 50 can easily be attached and detached from the ECU bracket 51.

As shown in FIGS. 7(a) and 7(b), a rear end wall 73 and a sandwich section 74 are formed in a rear section 51c of the ECU bracket 51. The rear end wall 73 extends rearward while keeping its width dimension the same as that of the constricted shape, and then bends downward in a rear end section of the rear end wall 73. The sandwich section 74 is formed by folding the lowest side of the rear end wall 73 obliquely downward and frontward.

The rear end wall 73 is formed with a second exposed opening section 75 in a center section in the width direction. From the second exposed opening section 75, the ECU 50 faces outward (is exposed) in the state where the ECU 50 is attached to the ECU bracket 51. Thus the attached ECU 50 can be gripped by hand. That is, the second exposed opening section 75 is provided to make the attachment and detachment of the ECU 50 easier in the same manner as the first exposed opening section 72.

The sandwich section 74 is formed with a width dimension larger than the width dimension of the constricted shape to more reliably grip the ECU 50 using a large area. The sandwich section 74 also causes the attached ECU 50 to be biased upward.

The ECU bracket 51 has the U-shape when seen from the side. Accordingly, the rigidity of the ECU bracket 51 is improved. That is, even if a bending load is applied to the ECU bracket 51 from the upper side of the vehicle body in a state where the ECU bracket is connected to the right and left seat rails 15, the ECU bracket 51 hardly bend since the section modulus is increased by the U-shape.

Figure 10:
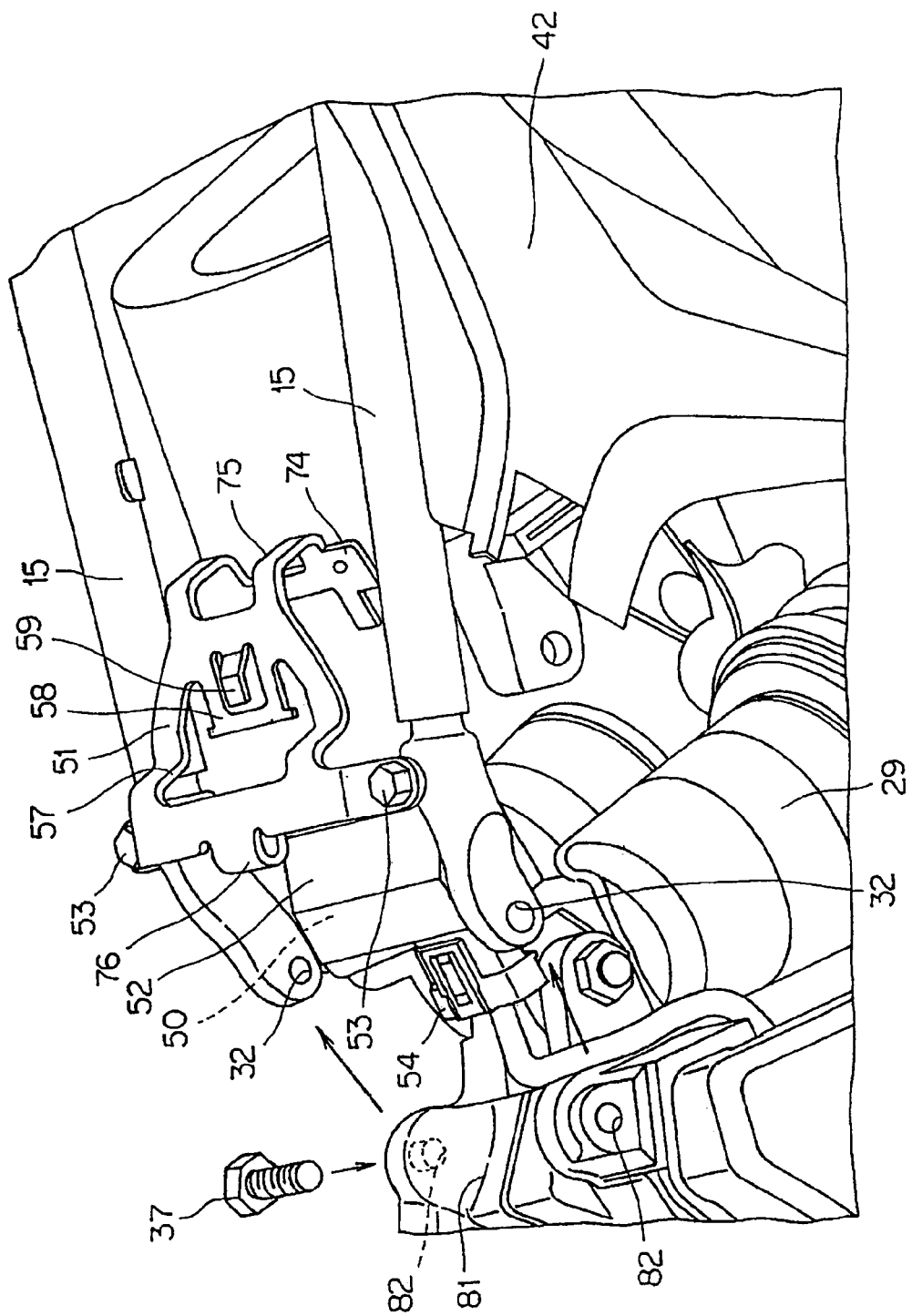
FIG. 10 is an exploded perspective view showing a state where the seat rails are removed from FIG. 2.

FIG. 10 is a perspective view showing a state where the seat rails 15 are detached, as compared with the state of FIG. 5.

When the bolts 37 are removed and the seat rails 15 are removed from the center frames 4, the ECU bracket 51 is removed together with the seat rails 15. At this time, the ECU 50 inserted into the elastic sheet 52 is pulled out from the opening section 77 on the front side of the ECU bracket 51 to be removed from the ECU bracket 51. That is, the ECU 50 is sandwiched by the ECU bracket 51 with the elastic sheet 52 therebetween by its elasticity, and therefore can be easily pulled out towards the front side of the vehicle body. Accordingly, the ECU 50 can be removed without removing the bolts 53 which connect the ECU bracket 51 with the seat rails 15.

With the electrical component attachment structure for a two-wheeled motor vehicle according to the embodiment of the present invention, the ECU bracket 51 is formed in the approximate U-shape having the opening section 77 directed frontward of the vehicle body and the ECU 50 is sandwiched and held inside the approximately U-shape. Meanwhile, the ECU 50 can be taken out towards the front of the vehicle body from the opening section 77. Thus, the ECU 50 inserted into the elastic sheet 52 can be pulled out from the ECU bracket 51 towards the front of the vehicle body when the seat rails 15 are removed from the center frames 4 rearward of the vehicle body. In addition, the ECU 50 can be left on the center frame 4 side when the seat rails 15 are removed. Therefore, it is not necessary to remove the bolts 53 to remove the seat rails 15 from the ECU bracket 51, or to remove the wiring connected to the connector 54. As a result, the attachment and detachment of the seat rail 15 can be performed easily.

Since the ECU 50 is supported inside the ECU bracket 51 with the elastic sheet 52 therebetween, the ECU 50 can be protected from vibration by the elasticity of the elastic sheet 52. Accordingly, the vertical vibration and the like of the vehicle body while running can be absorbed, and the reliability of the ECU 50 can be improved.

Since the ECU 50 is sandwiched inside the U-shape by the elasticity of the elastic sheet 52, it is not necessary to use a tightening member such as a bolt to attach the ECU 50 to the ECU bracket 51. Further, since the ECU 50 can be removed easily from the seat rails 15 without removing the bolts 53 which attach the ECU bracket 51 to the seat rails 15, the attachment and detachment of the seat rails 15 can be performed easily.

Further, the ECU bracket 51 is attached in a manner connecting the right and left seat rails 15, and therefore can serve as a cross member connecting the right and left seat rails 15 to improve the rigidity of the vehicle body. Particularly, since the sectional shape is a U-shape, the section modulus with respect to the bend in the vertical direction is high, and the rigidity as the cross member can further be improved.

Since the seat locking hole 57 to which the seat 14 is attached is formed on the upper surface of the ECU bracket 51, a function of fixing the seat 14 can be added to the ECU bracket 51. Particularly in the ECU bracket 51 made in the U-shape, downward flexures can be reduced, thus an occupant seated in the seat 14 does not feel discomfort.

The ECU bracket 51 is provided with the first exposed opening section 72 and the second exposed opening section 75 in which the ECU 50 faces outside from the ECU bracket 51 in the state where the ECU 50 is attached inside the ECU bracket 51. Thus, the ECU 50 can directly be gripped by hand from the first exposed opening section 72 and the second exposed opening section 75. Therefore, when removing the seat rails 15 from the center frames 4, the work of holding the ECU 50 from the first exposed opening section 72 and the second exposed opening section 75 and pulling it out towards the front of the vehicle body can be performed easily.

Further, since the hook section 76 is provided to the ECU bracket 51 having the function as the cross member, the fuel tank 13 can be attached more reliably by hooking a rubber band extending from the fuel tank 13 to the hook section 76.

Since the interference prevention section 59 is provided to the ECU bracket 51, the seat 14 and the elastic sheet 52 do not interfere with each other at the time of attaching and detaching the seat 14. Therefore, attachment positions of the elastic sheet 52 and the ECU 50 are not displaced at the time of the seat attachment and detachment.

Moreover, the elastic sheet 52 is provided with the engagement section 52b, the ECU bracket 51 is provided with the restriction section 58, and the restriction section 58 is inserted to the engagement section 52b when the ECU 50 is attached. Thus, the attachment position of the ECU 50 is not displaced in the ECU bracket 51. Therefore, the ECU 50 can be more reliably fixed.

The restriction section 58 is provided with the locking section 58a at the tip end, and the locking section 58a is hooked to the edge section of the opening section 52a of the elastic sheet 52. Thus, the attachment position of the ECU 50 is not displaced in the ECU bracket. Therefore, the ECU 50 can be more reliably fixed.

The embodiment of the present invention has been described above, but various variations and modifications are possible based on the technical idea of the present invention.

For example, although both of the first exposed opening section 72 and the second exposed opening section 75 are provided to facilitate the attachment and detachment of the ECU 50 in this embodiment, only one of the opening sections may be provided according to necessity.

The ECU 50 for FI control is attached to the seat rails 15 in this embodiment, but it may be an electrical component for a different control. Other functions are, for example, an antilock brake system (ABS) unit and the like.

Further, the seat locking hole 57 for hooking and fixing the seat 14 to the ECU bracket 51 is provided in this embodiment, but it is not limited to a hole. That is, it may have a hook shape for hooking the seat 14.

Further, the ECU bracket 51 has the approximate U-shape when seen from the side in this embodiment, but it is not limited thereto. For example, the U-shape may be directed such that the U-shape is seen from the upper side of the vehicle body, as long as the opening section 77 is directed forward of the vehicle body and the ECU 50 can be taken out in a direction forward of the vehicle body. In this case as well, the ECU 50 can be left on the center frame 4 side by pulling out the ECU 50 towards the front of the vehicle body from the ECU bracket 51 when removing the seat rails 15 from the center frames 4. Thus, the attachment and detachment of the seat rails 15 can be performed easily.

Although a specific form of embodiment of the instant invention has been described above and illustrated in the accompanying drawings in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. An electrical component attachment structure for a two-wheeled motor vehicle, comprising:
    a main frame which supports an engine,
    a center frame which extends vertically behind the engine,
    left and right seat rails detachably attached to said center frame, and
    a bracket attached to said left and right seat rails and adapted to support an electrical component, said bracket having a U-shape with an open section of the U-shape directed toward the front of the vehicle,
    wherein said bracket is configured to support the electrical component inside the U-shape,
    wherein the electrical component is removable from said open section of said bracket by moving the electrical component toward the front of the vehicle,
    wherein said bracket further comprises an exposed opening section through which left and right side sections of the supported electrical component is exposed,
    wherein a width dimension between left and right sides of a center section of the bracket decreases toward the rear side such that left and right end sections form a constricted shape, and
    wherein from the exposed opening section, the left and right side sections of the electrical component protrude respectively in a state where the electrical component is attached to the bracket.

2. The electrical component attachment structure for a two-wheeled motor vehicle according to claim 1, wherein an elastic member is disposed between the electrical component and said bracket.

3. The electrical component attachment structure for a two-wheeled motor vehicle according to claim 2,
    wherein said bracket forms a cross member connecting said left and right seat rails, and
    wherein a seat engagement section is formed on an upper surface of said bracket, a seat of the vehicle being attachable to said seat engaging portion.

4. The electrical component attachment structure for a two-wheeled motor vehicle according to claim 3, wherein said bracket further comprises a restriction section which engages with the elastic member to restrict movement of the elastic member.

5. The electrical component attachment structure for a two-wheeled motor vehicle according to claim 4, wherein said bracket further comprises an interference prevention section which prevents the seat and the elastic member from interfering with each other.

6. The electrical component attachment structure for a two-wheeled motor vehicle according to claim 3, wherein said bracket further comprises an interference prevention section which prevents the seat and the elastic member from interfering with each other.

7. The electrical component attachment structure for a two-wheeled motor vehicle according to claim 2, wherein said bracket further comprises a restriction section which engages with the elastic member to restrict movement of the elastic member.

8. The electrical component attachment structure for a two-wheeled motor vehicle according to claim 7, wherein said bracket further comprises an interference prevention section which prevents the seat and the elastic member from interfering with each other.

9. The electrical component attachment structure for a two-wheeled motor vehicle according to claim 1,
   wherein said bracket forms a cross member connecting said left and right seat rails, and
   wherein a seat engagement section is formed on an upper surface of said bracket, a seat of the vehicle being attachable to said seat engaging portion.

10. The electrical component attachment structure for a two-wheeled motor vehicle according to claim 9, wherein said bracket further comprises a restriction section which engages with the elastic member to restrict movement of the elastic member.

11. The electrical component attachment structure for a two-wheeled motor vehicle according to claim 10, wherein said bracket further comprises an interference prevention section which prevents the seat and the elastic member from interfering with each other.

12. The electrical component attachment structure for a two-wheeled motor vehicle according to claim 9, wherein said bracket further comprises an interference prevention section which prevents the seat and the elastic member from interfering with each other.

\* \* \* \* \*